(12) United States Patent
Sakashita et al.

(10) Patent No.: US 9,143,075 B2
(45) Date of Patent: Sep. 22, 2015

(54) DRIVE CONTROL DEVICE AND DRIVE CONTROL METHOD FOR MOTOR

(71) Applicant: HITACHI AUTOMOTIVE SYSTEMS, LTD., Hitachinaka-shi, Ibaraki (JP)

(72) Inventors: Tomio Sakashita, Isesaki (JP); Hiroshi Aoyagi, Isesaki (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 176 days.

(21) Appl. No.: 14/037,834

(22) Filed: Sep. 26, 2013

(65) Prior Publication Data
US 2014/0265965 A1     Sep. 18, 2014

(30) Foreign Application Priority Data

Mar. 14, 2013   (JP) ................. 2013-051579

(51) Int. Cl.
| | |
|---|---|
| *H02P 6/14* | (2006.01) |
| *H02P 23/00* | (2006.01) |
| *H02P 3/18* | (2006.01) |
| *B62D 5/04* | (2006.01) |
| *H02P 27/08* | (2006.01) |
| *H02M 1/084* | (2006.01) |
| *H02M 3/156* | (2006.01) |

(52) U.S. Cl.
CPC .............. *H02P 23/0036* (2013.01); *B62D 5/04* (2013.01); *H02P 3/18* (2013.01); *H02P 6/14* (2013.01); *H02P 27/08* (2013.01); *H02M 1/084* (2013.01); *H02M 3/156* (2013.01)

(58) Field of Classification Search
USPC .............. 318/9, 139, 400.21, 400.22, 400.26, 318/400.3, 400.17, 684, 811, 722; 363/56.02, 124; 701/42; 307/10.6
See application file for complete search history.

(56) References Cited

U.S. PATENT DOCUMENTS

| | | | |
|---|---|---|---|
| 8,541,967 B2* | 9/2013 | Shibata ................... | 318/400.21 |
| 8,698,435 B2* | 4/2014 | Tada ......................... | 318/400.21 |
| 2003/0071587 A1* | 4/2003 | Suzuki et al. ............... | 318/139 |
| 2008/0217095 A1* | 9/2008 | Ono ........................... | 180/443 |

FOREIGN PATENT DOCUMENTS

| | | | |
|---|---|---|---|
| JP | 2006-021645 A | | 1/2006 |
| JP | 2006021645 A | * | 1/2006 |

* cited by examiner

*Primary Examiner* — Kawing Chan
*Assistant Examiner* — Jorge L Carrasquillo
(74) *Attorney, Agent, or Firm* — Foley & Lardner LLP

(57) ABSTRACT

The present invention provides a motor drive control device provided with a shutoff circuit employing semiconductor relays and configured to drive a motor by a duty ratio control of an inverter, which stably drives the motor even in an operation state that drive duty ratio of phases are uneven. In the motor drive control device, output lines of three phases of the inverter circuit are connected to phases of the motor and further connected to a booster circuit, an output boosted by the booster circuit at a time of drive of the motor is distributed to semiconductor relays connected to respective phases of the motor, and furthermore, a switching circuit for stopping actuation of the booster circuit to shut off drive of the motor, is interposed in a line for supplying an electric power to the booster circuit.

13 Claims, 7 Drawing Sheets

DRIVE CONTROL DEVICE AND DRIVE CONTROL METHOD FOR MOTOR

BACKGROUND OF THE INVENTION

1. Field of the Invention

The present invention relates to a drive control device for a motor and a drive control method, provided with a switching circuit for stopping operation of the motor.

2. Description of Related Art

Japanese Laid-open Patent Application Publication No. 2006-21645 discloses that in an electric power steering device, a semiconductor relay, that has a higher reliability than a mechanical relay, is provided in an output line of each phase connecting an inverter circuit and a motor, and the semiconductor relay is turned off to stop drive of the motor in order to shut off the drive of the motor.

However, in an operation state that a phase in the inverter circuit is controlled with a particularly high duty ratio as compared with other phases, in an output line of the phase with a particularly high duty ratio, boosting of a booster circuit is not performed or the boosting is insufficient during drive of the motor, so that the semiconductor relay may be turned off to stop operation of the motor.

SUMMARY OF THE INVENTION

Under the circumstances, it is an object of the present invention to provide a drive control device and a drive control method for a motor, which has a switching circuit employing a semiconductor relay having a high reliability, and the drive control device drives a motor stably even in an operation state that driving duty ratio significantly differs between phases.

In order to achieve the above object, an aspect of the present invention provides a motor drive control device including an inverter circuit of n (which is equal to or greater than 3) phases of which output lines of respective phases are connected to respective phases of an n phase motor, and which controls drive of the motor based on an output signal of the inverter circuit, and the motor drive control device includes: a booster circuit which is connected to output lines of at least (n–1) phases of the inverter circuit; semiconductor relays which are connected to respective phases of the motor connected to the output lines of at least (n–1) phases of the inverter circuit and which are adapted to receive the outputs boosted by the booster circuit and distributed as relay drive signals at a time of driving the motor; and a switching circuit which stops actuation of the booster circuit and turns off the semiconductor relays to shut off the drive of the motor.

Furthermore, an aspect of the present invention provides a motor drive control method of connecting output lines of an inverter circuit of n (which is equal to or greater than 3) phases to respective phases of an n phase motor, and controlling drive of the motor based on an output signal of the inverter circuit, and the motor drive control method includes: boosting outputs of at least (n–1) phases of the inverter circuit by a booster circuit at a time of driving the motor; distributing the outputs boosted by the booster circuit to semiconductor relays which are connected to respective phases of the motor connected to the output lines of at least (n–1) phases of the inverter circuit as relay drive signals; and stopping actuation of the booster circuit to shut off the drive of the motor.

Other objects and features of aspects of the present invention will be understood from the following description with reference to the accompanying drawings.

DESCRIPTION OF PREFERRED EMBODIMENTS

Figure 1:
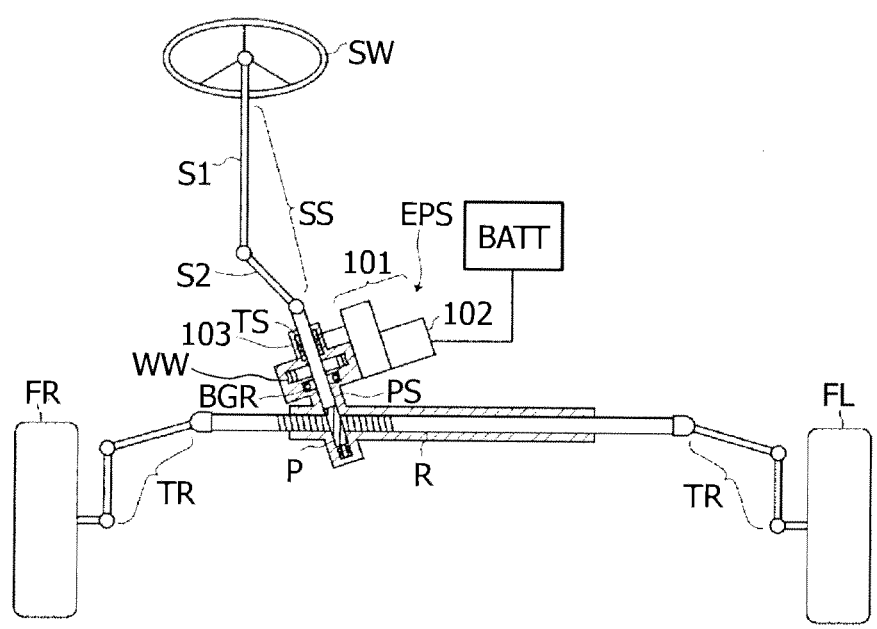
FIG. 1 is a system construction diagram illustrating an electric power steering device (EPS) for a vehicle.

FIG. 1 is a system construction diagram illustrating an electric power steering device (EPS) for a vehicle.

A steering device to which such an EPS is applied has a manipulation mechanism, a gear mechanism and a link mechanism.

The manipulation mechanism has a steering wheel SW and a steering shaft (column shaft) SS. The steering shaft SS includes a first steering shaft S1 and a second steering shaft S2 (middle shaft).

The gear mechanism is of a rack and pinion type, which has a rack R and a pinion P. Pinion P is provided at a tip of a pinion shaft PS connected to second shaft S2, and engages with rack R.

The link mechanism has a tie rod TR connected to rack R and steered wheels FL and FR connected to tie rod TR.

An EPS 101 is of an electric direct connect type which has an electric motor 102 configured to directly drive a gear to generate an assisting force, and is of a pinion assist type which is attached to pinion shaft PS and provides an assisting force to rotation of pinion shaft PS.

EPS 101 has a motor 102 driven by electric power (electric current) supplied from a battery BATT as a power supply; a reduction gear mechanism 103 which reduces rotation of motor 102; a torque sensor TS which detects a steering torque; a resolver, not illustrated, which detects rotation (rotation angle or rotational position) of the motor; an electronic control unit ECU which receives signals from these sensors and controls drive of motor 102. These components are accommodated in a single housing HSG, and EPS 101 is constituted as a unit integrally including mechanical components and electronic components.

EPS 101 is an example of a pinion EPS, but there are other EPSs such as dual pinion EPSs, rack EPSs or column EPSs, and an embodiment of the present invention is applicable to any type of EPS.

Figure 2:
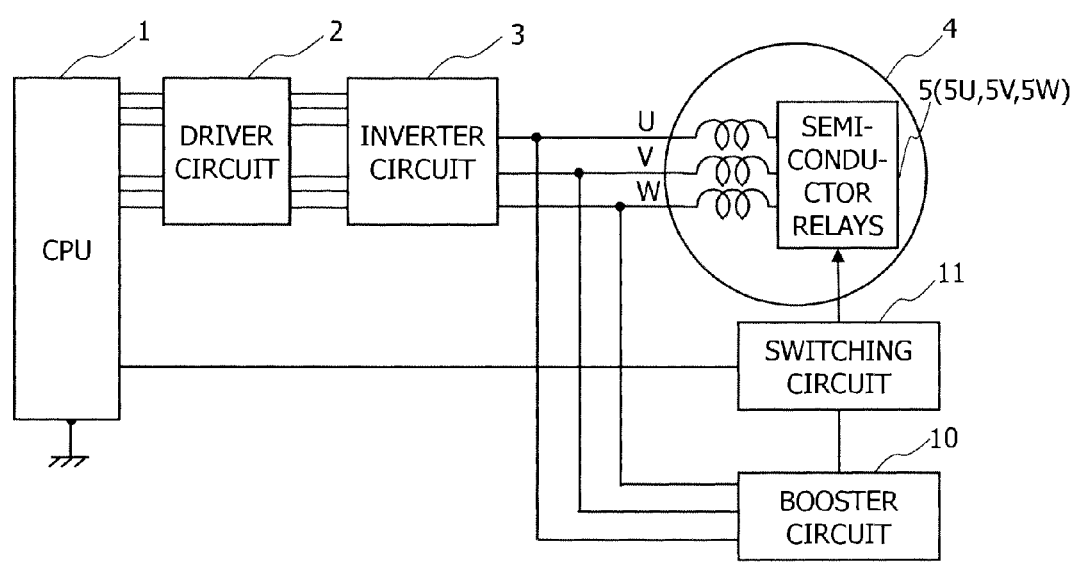
FIG. 2 is a view schematically illustrating a drive control device for a motor according to an embodiment of the present invention to be applied to the EPS etc.

FIG. 2 schematically illustrates a drive control device for a motor including a switching circuit, to be employed for the abovementioned EPS etc.

A CPU 1 outputs a PWM signal for inverter drive to a driver circuit 2 (FET driver). Driver circuit 2 expands a voltage level of the PWM signal and outputs the expanded PWM signal to an inverter circuit 3.

Inverter circuit 3 performs switching control of semiconductor switching elements and outputs PWM signals of U, V and W phases through output lines of respective phases to respective phases of a three phase motor 4 (motor 102 in the EPS of FIG. 1). Thus, motor 4 is driven.

In an EPS applied with such a mechanism, a drive force produced by the drive of motor 4 assists the steering force of steering operation of a vehicle driver.

Further, in such an EPS, it is necessary to make ineffective the assisting force for steering in such an occasion that an abnormality occurs to the vehicle, and for this purpose, a shutoff circuit for a motor is provided to shut off drive of the motor.

In FIG. 2, the shutoff circuit for a motor is constructed as follows.

Phases of motor 4 (U, V and W phases of a stator coil) have one ends to which PWM signals are input from inverter circuit 3 and the other ends connected together at a neutral point through respective semiconductor relays 5 (5U, 5V and 5W).

Further, the output lines of U, V and W phases of inverter circuit 3 are each branched and connected to a booster circuit 10, and during drive of motor 4, a control signal (gate voltage) boosted by booster circuit 10 is supplied to semiconductor relays 5 to allow drive of motor 4. Further, when a command of shutting off the drive of motor 4 is output from a CPU 1, a switching circuit 11 that has received the command stops operation of booster circuit 10 to maintain semiconductor relays 5 to be in OFF-state, to stop motor 4.

Figure 3:
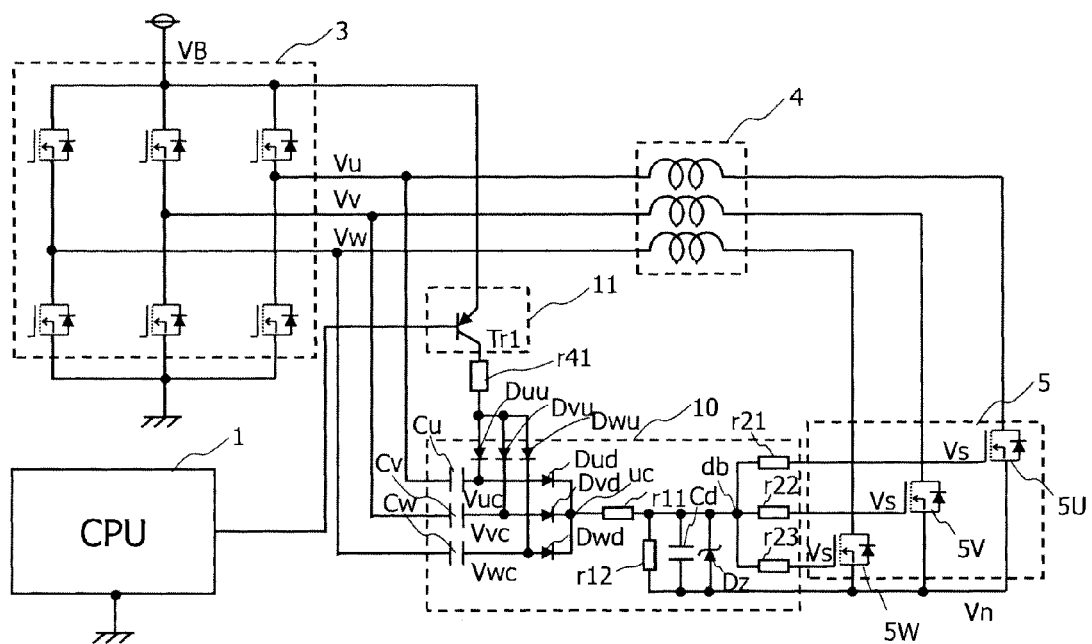
FIG. 3 is a detailed circuit diagram of a first embodiment of the above drive control device for a motor.

FIG. 3 illustrates a detailed circuit diagram of a first embodiment of a drive control device for a motor having the abovementioned schematic construction.

An inverter circuit 3 is constituted by a three-phase FET bridging circuit, and output voltages Vu, Vv and Vw output to U, V and W phases are input to upstream side capacitors Cu, Cv and Cw of booster circuit 10.

To the output side of capacitors Cu, Cv and Cw, downstream side diodes Dud, Dvd and Dwd are connected, respectively. The output side of these downstream side diodes Dud, Dvd and Dwd are connected together at an upstream side merging point uc, and the voltage is extracted as a common output voltage (gate voltage) Vs.

Common gate voltage Vs propagates through a resister r11, is branched into three phases U, V and W at a downstream side branch point db, propagates through resisters r21, r22 and r23 and is supplied to gate terminals of semiconductor relays 5U, 5V and 5W of U, V and W phases, respectively.

Further, between the downstream side of resister r11 and downstream side branch point db, an end of a downstream side capacitor Cd is connected, and the other end of capacitor Cd is connected to a neutral point Vn of motor 4.

A resister r12 and a zener diode Dz are connected so as to be in parallel to capacitor Cd, so that a potential difference between gate voltage Vs and neutral point Vn is limited to be a breakdown voltage Vz (for example, about 15V) of zener diode Dz or smaller. Accordingly, it is possible to enhance durability of semiconductor relays 5U, 5V and 5W.

Downstream side terminals of U, V and W phases of motor 4 are connected to drain electrodes of semiconductor relays 5U, 5V and 5W, and source electrodes of semiconductor relays 5U, 5V and 5W are connected to neutral point Vn.

Further, an electric power supply circuit is provided, which supplies a power supply voltage VB through a resister r41 and upstream side diodes Duu, Dvu and Dwu of branched U, V and W phases, to points between capacitors Cu, Cv, Cw and downstream side diodes Dud, Dvd, Dwd. In this first embodiment, a transistor Tr1 is provided between the power supply and a resister r41 (or between resister r41 and upstream side diodes Duu, Dvu, Dwu) as a switching circuit.

Transistor Tr1 has a base terminal adapted to receive a switch signal output from CPU1, and usually, the base terminal of transistor Tr1 is maintained to be at L level to put transistor Tr1 in ON-state, so as to supply the power supply voltage to booster circuit 10 to operate the booster circuit and to drive motor 4.

Hereunder, specific actuation examples will be described with reference to timing charts of FIGS. 4 to 6.

Figure 4:
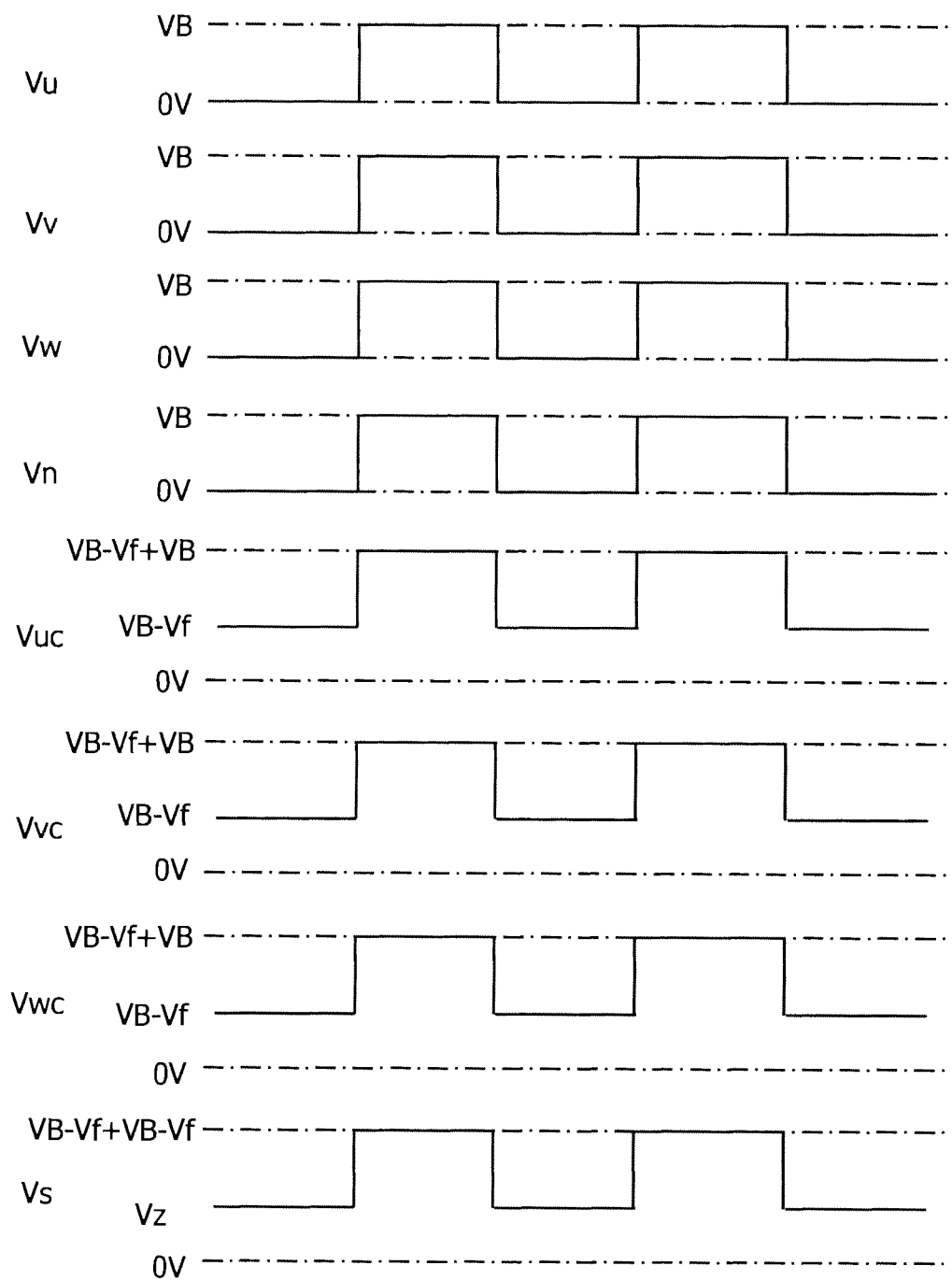
FIG. 4 is a timing chart illustrating potentials at various portions when U, V and W phases of the inverter circuit are driven at a duty ratio of 50%.

FIG. 4 illustrates potentials at various portions when U, V and W phases of the inverter circuit are driven at a duty ratio of 50%.

When output voltages Vu, Vv and Vw of three phases U, V and W of inverter circuit 3 are at L level (0V), input-side voltages of capacitors Cu, Cv and Cw are also at L level (0V), and output side voltages Vuc, Vvc and Vwc of capacitors Cu, Cv and Cw become as follows.

$$Vuc=VB-Vf$$

$$Vvc=VB-Vf$$

$$Vwc=VB-Vf$$

Here, Vf is a cut-in voltage (for example, about 0.7V) of diodes Duu, Dvu and Dwu (and Dud, Dvd and Dwd).

Meanwhile, voltage (source voltage) Vn of the neutral point to be applied to source electrodes of semiconductor relays 5U, 5V and 5W is at L level (0V) which is the same as the output voltage of inverter circuit 3.

Further, voltage (gate voltage) Vs to be applied to gate electrodes of semiconductor relays 5U, 5V and 5W is lower than output voltages Vuc, Vvc and Vwc of capacitors Cu, Cv and Cw by cut-in voltage Vf of diodes Dud, Dvd and Dwd, and is as follows.

$$Vs=VB-2Vf$$

Accordingly, a potential difference ΔVsn between gate voltage Vs and source voltage Vn becomes VB−2Vf, and when this potential difference ΔVsn=VB−2Vf exceeds breakdown voltage Vz of zener diode Dz, this potential difference ΔVsn is maintained to be ΔVsn=Vz. Since the cut-in voltage of a diode is about 0.7V, when power supply voltage VB is at least 20V and breakdown voltage Vz is about 15V, potential difference ΔVsn is maintained to be ΔVsn=Vz.

Next, when output voltages Vu, Vv and Vw of three phases U, V and W of inverter circuit 3 rise to H level (VB), output voltages Vuc, Vvc and Vwc of capacitors Cu, Cv and Cw are raised by an output voltage rise VB of inverter circuit 3 by charge pumping, to be as follows.

$$Vuc=VB-Vf+VB=2VB-Vf$$

$$Vvc=VB-Vf+VB=2VB-Vf$$

$$Vwc=VB-Vf+VB=2VB-Vf$$

Further, since gate voltage Vs is lower than output voltages Vuc, Vvc and Vwc, that are each 2VB−Vf, by cut-in voltage Vf of downstream side diodes Dud, Dvd and Dwd, gate voltage becomes as follows.

$$Vs=VB-Vf+VB-Vf=2VB-2Vf$$

Simultaneously, source voltage Vn is also raised by output voltage rise VB of inverter circuit 3.

Accordingly, potential difference ΔVsn between gate voltage Vs and source voltage Vn is calculated to be as follows.

$$\Delta Vsn=Vs-Vn=2VB-2Vf-VB=VB-2Vf$$

Here, when calculated value VB−2Vf of this potential difference ΔVsn exceeds breakdown voltage Vz of zener diode Dz, potential difference ΔVsn is maintained to be breakdown voltage Vz. As described above, when power supply voltage VB is at least 20V and breakdown voltage Vz is about 15V, since VB−2Vf exceeds Vz, potential difference ΔVsn is maintained to be ΔVsn=Vz.

As described above, even if output voltages Vu, Vv and Vw of inverter circuit 3 are switched between H level and L level, potential difference between gate voltage Vs and source voltage Vn of each of semiconductor relays 5U, 5V and 5W becomes breakdown voltage Vz (or VB−2Vf) defined by zener diode Dz.

Since semiconductor relays 5U, 5V and 5W become ON-state when potential difference ΔVsn becomes at least a relay drive voltage V0 (for example, about 10V), potential difference ΔVsn (Vz or VB−2Vf) greater than relay drive voltage V0 is maintained. Accordingly, each of semiconductor relays 5U, 5V and 5W continues to be ON-state and drive of motor 4 can be continued.

Next, explanation will be made with respect to a case in which a phase, for example U phase, is driven at a duty ratio of 100% and other phases are driven at duty ratios lower than 100%, for example 50%, with reference to FIG. 5. In an example of power steering device, such an operation state occurs, for example, when an output torque significantly increases in such cases in which a steering is deeply steered in one rotational direction or the rotational direction is reversed.

Figure 5:
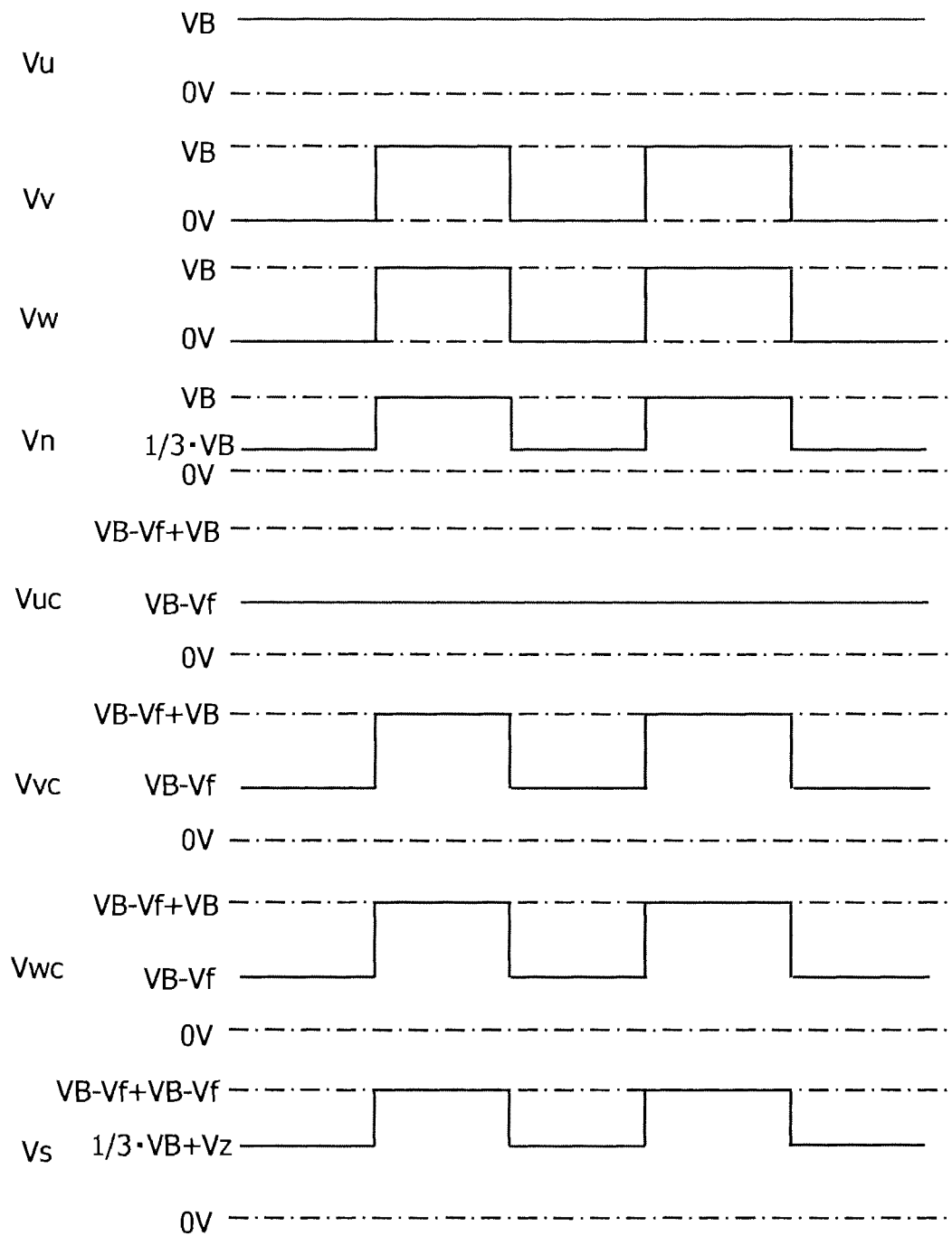
FIG. 5 is a timing chart illustrating potentials at various portions when U phase of the inverter circuit is driven at a duty ratio of 100% and V and W phases are driven at a duty ratio of 50%.

Output voltage Vu of inverter circuit 3 is maintained to be at H level (VB) as illustrated in FIG. 5, and output voltages Vv and Vw each shuttles between H level (VB) and L level (0V) with 50% duty ratio.

When output voltages Vv and Vw are at L level (0V), voltage (source voltage) Vn at the neutral point becomes an average voltage ⅓·VB since a voltage VB is applied from U phase of motor 4 and V phase and W phase are at L level (0V).

Meanwhile, gate voltage Vs is obtained in the following manner. Similar to the case in which each of U, V and W phases is driven at a duty ratio of 50%, gate voltage Vs is lower than output side voltages Vuc, Vvc and Vwc (=VB−Vf) of capacitors Cu, Cv and Cw, that are applied through the power supply line, by cut-in voltage Vf of diodes Dud, Dvd and Dwd. Accordingly, gate voltage Vs becomes Vs=VB−Vf−Vf=VB−2Vf.

Accordingly, potential difference ΔVsn between gate voltage Vs and source voltage Vn is calculated as follows.

$$\Delta Vsn = VB - 2Vf - \tfrac{1}{3} \times VB = \tfrac{2}{3} \times VB - 2Vf$$

When this calculated value ⅔×VB−2Vf exceeds breakdown voltage Vz of zener diode Dz, potential difference ΔVsn is maintained to be ΔVsn=Vz. In this case, gate voltage Vs becomes Vs=Vn+ΔVsn=⅓×VB+Vz. FIG. 5 illustrates a case in which ΔVsn=Vz and Vs=⅓×VB+Vz.

That is, although potential difference ΔVsn becomes ⅔×VB−2Vf or Vz, whichever smaller, since both of them are at least relay drive voltage V0, each of semiconductor relays 5U, 5V and 5W becomes ON-state.

Further, when output voltages Vv and Vw are at H level (VB), output voltage Vu also becomes at H level (VB), and voltage (source voltage) Vn at the neutral point rises to VB.

Further, output voltage Vuc of capacitor Cu is maintained to be Vuc=VB−Vf, but output voltages Vvc and Vwc of capacitors Cv and Cw are raised by VB by charge pumping, to be each VB−Vf+VB=2VB−Vf.

Then, the potential at merging point uc of downstream side diodes Dud, Dvd and Dwd, that is gate voltage Vs, becomes Vs=VB−Vf+VB−Vf=2VB−2Vf.

Accordingly, potential difference ΔVsn between gate voltage Vs and source voltage Vn becomes ΔVsn=2VB−2Vf−VB=VB−2Vf, but when this potential difference exceeds breakdown voltage Vz of zener diode Dz, the potential difference is maintained to be this breakdown voltage Vz.

Thus, even when one phase is driven at a duty ratio of 100% and other phases are driven at duty ratios lower than 100%, potential difference ΔVsn between gate voltage Vs and source voltage Vn is maintained to be at least relay drive voltage V0, and each of semiconductor relays 5U, 5V and 5W are maintained to be ON-state, so that drive of motor 4 can be continued.

Here, in the above Japanese Laid-open Patent Application Publication No. 2006-21645, since independent booster circuits are provided for respective phases, drive of a motor becomes difficult in such an operation state that one phase, for example U phase, is driven at a duty ratio of 100% or a duty ratio close to 100% and other phases V and W are driven at lower duty ratios.

That is, when U phase is driven at a duty ratio of 100%, there is no L level term in U phase, a potential difference between upper and lower sides of an upstream side capacitor is maintained to be low, and no charge pumping occurs. Furthermore, also in a case in which U phase is driven at a duty ratio close to 100% having short L level term, charge and discharge amount of the upstream side capacitor is small and charge pumping becomes insufficient.

Consequently, in U phase, it is not possible to sufficiently raise gate voltage Vs from source voltage Vn, and there may occur such a problem that a semiconductor relay of U phase is not turned on and a motor stops.

On the other hand, in the above embodiment, for example, when U phase is driven at a duty ratio of 100%, since input voltage Vu of upstream side capacitor Cu is maintained to be VB, output voltage Vuc is also maintained to be VB−Vf. However, in other phases that are V phase and W phase, due to a charge pumping by which discharge occurs when input voltage Vv or Vw is at L level (0V) and charge occurs when the input voltage is at H level (VB), output voltage Vvc or Vwc is boosted. Then, these boosted output voltages are supplied commonly to U, V and W phases, semiconductor relay 5U is also maintained to be in ON-state and drive of motor 4 can be continued.

Figure 6:
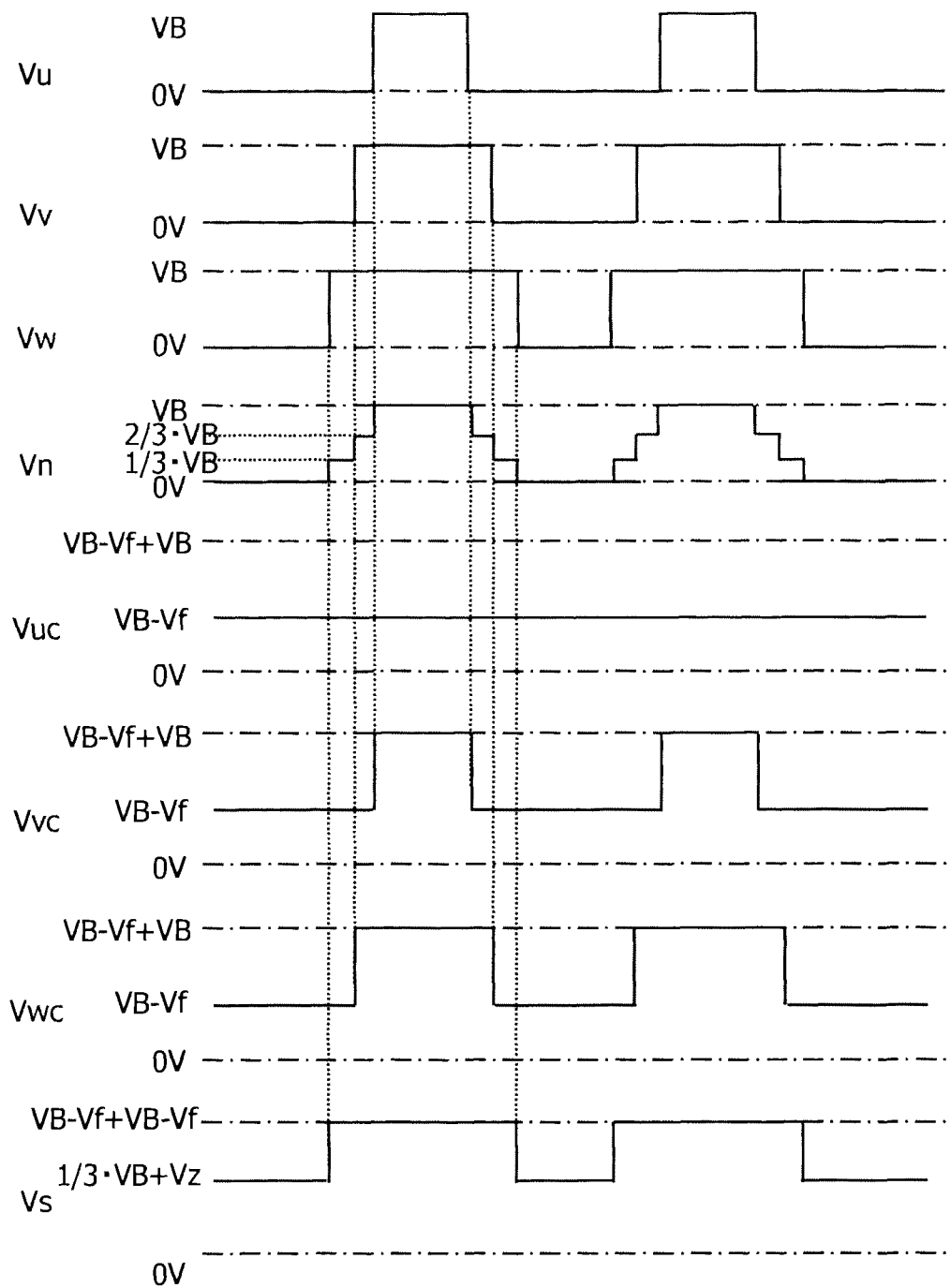
FIG. 6 is a timing chart illustrating potentials at various portions when U, V and W phases of the inverter circuit are driven at different duties.

FIG. 6 illustrates potentials of various portions when duty ratios of phases of inverter circuit 3 are different.

Also in this case, potential difference ΔVsn between gate voltage Vs and source voltage Vn can be maintained to be at least relay drive voltage V0, and semiconductor relays 5U, 5V and 5W are maintained to be ON-state, so that drive of motor 4 can be continued.

On the other hand, in such a case in which a power steering device needs to be operated manually, CPU1 outputs an H level switch signal corresponding to a shutoff command of a motor, to turn off a transistor Tr1 to stop supply of power supply voltage VB to booster circuit 10. Consequently, electric charges are discharged from capacitors Cu, Cv and Cw, so that potential difference ΔVsn between gate voltage Vs and source voltage Vn of each of semiconductor relays 5U, 5V and 5W decreases to turn off the semiconductor relays 5U, 5V and 5W, to thereby stop drive of motor 4.

Here, since operations of a plurality of semiconductor relays 5U, 5V and 5W are stopped by a shutoff operation of a single switching circuit, variation of stop timings of the plurality of semiconductor relays is suppressed, so that it is possible to suppress unintentional actuation of the motor within a duration from the shutoff operation to stop of all of semiconductor relays 5U, 5V and 5W of the respective phases, to suppress deterioration of steering ability (operation ability).

Figure 7:
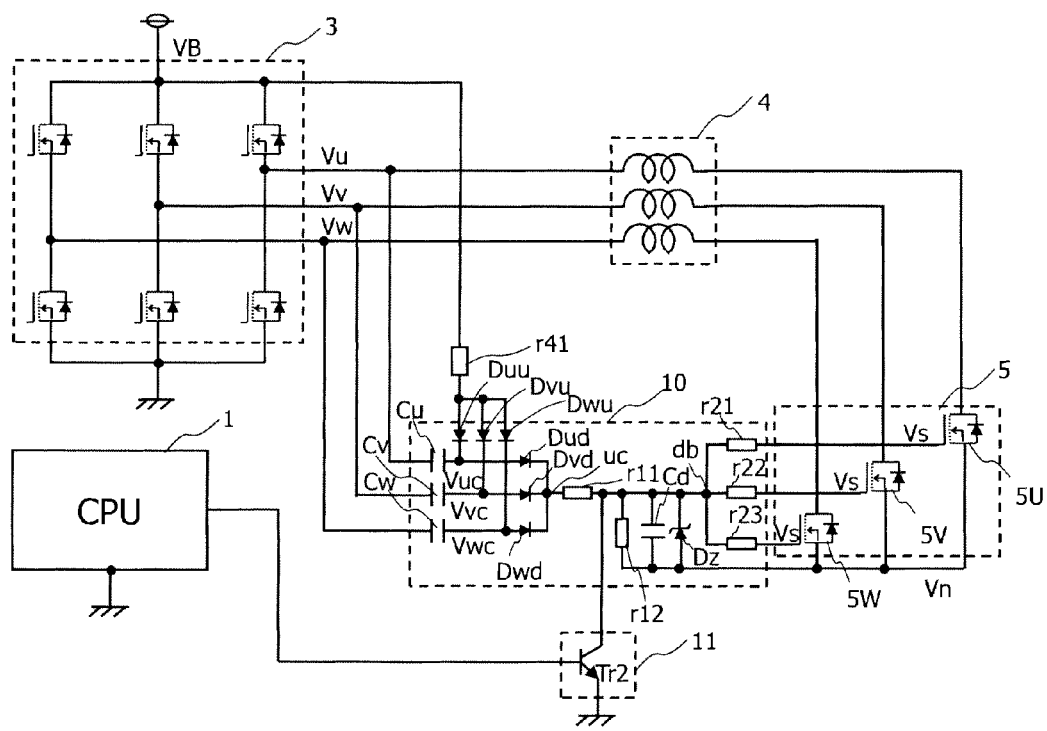
FIG. 7 is a detailed circuit diagram of a second embodiment of the above drive control device for a motor.

FIG. 7 is a detailed circuit diagram of a second embodiment of the above drive control device for a motor.

Second embodiment provides a circuit similar to that of embodiment 1. In the second embodiment, the circuit includes a transistor Tr2 as a switching circuit for stopping boosting function of a boosting circuit to shut off a motor, a corrector terminal of transistor Tr2 is connected to a point between resister r11 and resister r12, an emitter terminal thereof is grounded, and a base terminal thereof is adapted to receive a switch signal from CPU1.

When normally driving motor 4, the base terminal of transistor Tr2 is maintained to be at L level to put transistor Tr2 in OFF-state to drive motor 4 while activating booster circuit 10. Operation is similar to that at a time of normal operation of the motor (when transistor Tr1 is in ON-state) of first embodiment.

Further, when a switch signal of H level is output according to a shutoff command of the motor from CPU1, transistor Tr2 is turned on and electric charge stored in downstream side capacitor Cd is discharged. Consequently, potential difference $\Delta Vsn$ between gate voltage Vs and source voltage Vn of each of semiconductor relays 5U, 5V and 5W decreases to turn off semiconductor relays 5U, 5V and 5W to thereby stop drive of motor 4.

Further, also in second embodiment, when the device is applied to a power steering device, since operations of a plurality of semiconductor relays 5U, 5V and 5W are stopped by a shutoff operation of a single switching circuit, variation of stop timings of the plurality of semiconductor relays is suppressed, so that it is possible to suppress unintentional actuation of the motor within a duration from the shut off operation to stop of all of semiconductor relays 5U, 5V and 5W of the respective phases, to suppress deterioration of steering ability (operation ability).

Further, in second embodiment, since shutoff position by switching circuit 11 is close to semiconductor relays 5U, 5V and 5W, it is possible to reduce stop-delay time of the semiconductor relays.

Further, in the abovementioned embodiments, since downstream side capacitor Cd is connected to the neutral point of motor 4 at which voltage varies, electric charge supplied from inverter circuit 3 is suppressed, and it is possible to reduce charging time to capacitor Cd, to suppress activation start delay of semiconductor relays 5.

Here, the construction may be such that semiconductor relays 5U, 5V and 5W are connected between output terminals of U, V and W phases of inverter circuit 3 and input terminals of U, V and W phases of motor 4.

Further, the circuit of the abovementioned embodiment includes output lines of three phases U, V and W connected to the booster circuit to control semiconductor relays for the three phases and the circuit is configured to turn off the semiconductor relays of three phases when the motor shuts off, and thus, it is possible to shut off the motor with high response.

Here, the construction may be such that output lines of two phases among three phases U, V and W are connected to the booster circuit and the circuit is configured to control semiconductor relays for corresponding two phases. In this case, it is possible to shut off the two phases to shut off the motor, so that the construction is simplified and the cost can be reduced.

Further, the present invention is applicable to an n-phase motor of at least three phases, and it is possible to shut off the motor by shutting off (n−1) phases.

The entire contents of Japanese Patent Application No. 2013-51579 filed on Mar. 14, 2013, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A motor drive control device including an inverter circuit of n (which is equal to or greater than 3) phases of which output lines of respective phases are connected to respective phases of an n phase motor, and which controls drive of the motor based on an output signal of the inverter circuit;

the motor drive control device comprising:

a booster circuit which is connected to output lines of at least (n−1) phases of the inverter circuit and boosts outputs of the output lines;

semiconductor relays which are interposed in respective phases of the motor connected to the output lines of at least (n−1) phases of the inverter circuit and which are adapted to receive the outputs boosted by the booster circuit and distributed as relay drive signals at a time of driving the motor; and a switching circuit which stops actuation of the booster circuit and turns off the semiconductor relays to shut off the drive of the motor.

2. The motor drive control device according to claim 1, wherein the booster circuit includes: at least (n−1) pieces of diodes interposed in a power supply line for the booster circuit at a position on the upstream side of connecting points with output lines of the inverter circuit of at least (n−1) phases; and a capacitor for storing electric charge which has one end connected to the output end of the diodes, and the other end of the capacitor is connected to a neutral point to which the phases of the motor are connected.

3. The motor drive control device according to claim 2, wherein the booster circuit includes: a zener diode which is connected in parallel with the capacitor and limits a voltage between the terminals of the capacitor to be at most a predetermined voltage.

4. The motor drive control device according to claim 2, wherein the booster circuit further includes: at least (n−1) pieces of upstream side capacitors for storing electric charge interposed in the output lines of at least (n−1) phases of the inverter circuit on the upstream side of the connecting points with the diodes; and downstream side diodes of at least (n−1) phases connected to the downstream side of the capacitors, and the output terminals of the downstream side diodes are connected together at a connecting point, and the output at the connecting point is distributed to the semiconductor relays.

5. The motor drive control device according to claim 1, wherein the switching circuit is interposed in the power supply line for the booster circuit.

6. The motor drive control device according to claim 1, wherein the switching circuit is interposed in a line for discharging the electric charge stored in the capacitor.

7. The motor drive control device according to claim 1, wherein the semiconductor relays are interposed between the output sides of the respective phases of the motor connected to the output lines of at least (n−1) phases of the inverter circuit, and a neutral point to which the phases of the motor are connected.

8. The motor drive control device according to claim 1, wherein the semiconductor relays are interposed between the output lines of at least (n−1) phases of the inverter circuit, and the at least (n−1) phases of the motor.

9. The motor drive control device according to claim 1, wherein the output lines of all of three phases U, V and W of the inverter are connected to the booster circuit.

10. The motor drive control device according to claim 1, wherein the output lines of two of three phases U, V and W of the inverter are connected to the booster circuit.

11. The motor drive control device according to claim 1, wherein the motor is a motor for driving an electric power steering device of a vehicle.

12. A motor drive control device including an inverter circuit of n (which is equal to or greater than 3) phases of which output lines of respective phases are connected to respective phases of an n phase motor, and which controls drive of the motor based on an output signal of the inverter circuit;

the motor drive control device comprising:
booster means which is connected to output lines of at least (n−1) phases of the inverter circuit and boosts outputs of the output lines;
semiconductor relays which are interposed in respective phases of the motor connected to the output lines of at least (n−1) phases of the inverter circuit and which are adapted to receive the outputs boosted by the booster means and distributed as relay drive signals at a time of driving the motor; and
switching means which stops actuation of the booster means and shuts off the drive of the motor.

13. A motor drive control method for controlling drive of a motor based on an output signal of an inverter circuit, in which output lines of the inverter circuit of n (which is equal to or greater than 3) phases are connected to respective phases of an n phase motor, the motor drive control method comprising the following steps:
boosting outputs of at least (n−1) phases of the inverter circuit by a booster circuit at a time of driving the motor;
distributing the outputs boosted by the booster circuit to semiconductor relays which are interposed in respective phases of the motor connected to the output lines of at least (n−1) phases of the inverter circuit, as relay drive signals; and
via a switching circuit, stopping actuation of the booster circuit and turning off the semiconductor relays to shut off the drive of the motor.

* * * * *